United States Patent [19]
Edwards

[11] Patent Number: 6,059,418
[45] Date of Patent: May 9, 2000

[54] FORWARD VIEW MIRROR SYSTEM

[76] Inventor: William T. Edwards, 3124 Jeffery Rd., Baltimore, Md. 21207

[21] Appl. No.: 08/353,663

[22] Filed: Dec. 12, 1994

[51] Int. Cl.⁷ ...................................................... G02B 5/08
[52] U.S. Cl. ........................... 359/857; 359/850; 359/856
[58] Field of Search ..................... 359/850, 856, 359/857, 854, 843, 861, 862, 864, 865, 867, 863

[56] References Cited

U.S. PATENT DOCUMENTS

| | | | |
|---|---|---|---|
| 1,870,468 | 8/1932 | Ross | 359/863 |
| 4,469,405 | 9/1984 | Chin-Won | 359/861 |
| 4,643,544 | 2/1987 | Loughran | 359/866 |

FOREIGN PATENT DOCUMENTS

| | | | |
|---|---|---|---|
| 2575710 | 7/1986 | France | 359/857 |
| 3807549 | 11/1988 | Germany | 359/850 |

*Primary Examiner*—Cassandra Spyrou
*Assistant Examiner*—Mohammad Y. Sikder
*Attorney, Agent, or Firm*—Law Offices of Royal W. Craig

[57] ABSTRACT

A system of mirrors for a vehicle which augments an operators vision to allow a clear vision path past a forward obstacle. The operators vision is reflected backwards by a first mirror. This first mirror is angles towards a second mirror facing forward. The resulting reflection of the second mirror allows the operator to see along side of any obstruction which may be blocking forward vision, such as a larger vehicle.

4 Claims, 5 Drawing Sheets

FORWARD VIEW MIRROR SYSTEM

BACKGROUND OF THE INVENTION

Safe operation of an automobile depends in large part on the attentiveness of the driver. Most automobile accidents are a result of human error rather than mechanical failure. This is especially true in today's technological marketplace. State of the art automaking has virtually eliminated the possibility of accidents occuring as a consequence of fatigued or failed part. In fact, after virtually eliminating accidents associated with mechanical failure, the auto industry has refocused their design efforts on the safety of automobile operators who will inevitable at one time or another be involved in an accident due to exercising incorrect judgment on the road, operating a vehicle in a careless manner, or being the unfortunate innocent victim of another operator.

These new safety features, some required by law, are designed to protect the driver and passengers after an accident has occurred. Some of the more popular features proliferated by the industry today are driver and passenger air bags, automatic safety belts, and solid steel reinforced doors and body panels. While these innovations are sure to save the lives of many people who are involved in accidents, they do not lend any means of preventing the accident from occurring in the first place.

Some automobile manufacturers have seen this shortcoming as a major aspect of design improvement and have thus focused attention on the prevention of accidents. The most commonly known innovation coming out of this process is the anti-lock brake system. This system mechanically applies and releases the brakes in miniscule time intervals when the brake pedal is depressed. This prevents a skid from occuring when an operator of an automobile applies the brakes of a car attempting to stop very quickly. This may occur when the operator did not see an obstruction with enough time to brake normally and is panicked into fully engaging the brake system.

While the antilock braking system will offer protection once an obstruction is observed by the operator, if enough distance remains between the two, it does not help the driver to see an obstruction before extreme braking measures are required. Automanufacturers have realized that braking time is directly related to stopping distance and that stopping distance is directly related to operator attentiveness. Therefore, in order to increase braking time, automanufacterer have installed a third brake light located conspicuously at eye level on the rear of cars. Both of these innovations in auto safety will definitely increase driver attentiveness; however, clear vision is an equally important asset in accident prevention. None of the safety features described thus far effectuate attentiveness or clear vision in situations where a driver's vision directly impaired.

While increasing attentiveness of the driver may be somewhat limited, presenting clear visual access to areas surrounding the driver is well within the control of the auto designers. The most common device utilized by auto manufacturers to assist the driver with clear vision, which is also mandated by statute in most states, is a rear view mirror. This device is implemented typically on the front windshield, driver's, and passenger's door. The windshield rear view mirror is angled in a way that allows the driver to see the road and other vehicles behind his or her own car with, at most, minimum movement of the head. The side rear view mirror is angled to allow the driver to view the adjacent lane directly behind the driver as well as the road and cars behind and to one side, depending which side of the car the mirror is located, of his or her own car. These mirrors are essential to the safe operation of a vehicle when turning or changing lanes as well as keeping a driver generally informed of his or her surroundings subsiding any psychological fear cause by not being able to foresee any dangerous conditions which may be pending or unraveling.

This psychological fear associated with an obstruction of vision is a significant factor compromising the safe operation of a vehicle, as the driver, in an effort to alleviate the fear of not being aware of his or her surroundings, will often either look backward physically or position the vehicle to see around an obstruction.

While the rear view mirror successfully removes fear associated with hindsight, automanufacturers have ignored the loss of forward vision that a driver experiences when their view is blocked by a forward obstruction, such as a truck or a bus. This situation often leads to a driver swerving from one side to the other in an effort to obtain a glimpse of what lies ahead. Furthermore, not being able to see around the forward obstruction prevents the driver from being able to anticipate when the obstruction might slow down or stop suddenly.

SUMMARY OF THE INVENTION

This invention relates to a system of mirrors. More particularly, this invention relates to a system of mirrors utilized on an automobile which allows the driver to see around a forward obstruction such as a truck or bus.

In this invention, the arrangement of two mirrors will enable the driver to view into the first, and see a reflection of the image which is ahead when direct vision of this area is blocked by a larger vehicle.

The first mirror in the system is an existing side view mirror or a auxiliary side view mirror located in the vicinity of an existing side view mirrors This mirror will direct the operators vision towards the rear of the car where a second mirror will be mounted facing forward. The second mirror will further reflect the vision forward so that objects further down the road can be seen.

This second mirror will be mounted to the car in a different vertical plane of space than the first mirror preventing the forward reflection of vision from being obstructed by the first mirror.

It is therefore an object of this invention to enable a driver of an automobile to see the road ahead when direct vision in that direction is obstructed by a truck, a bus, or any other large vehicle, without switching lanes.

It is a further object of this invention to develop a safety feature that will become a standard on all new automobiles pursuant to a regulation adopted by the National Safety Commission and other safety institutions.

It is still another object of this invention to prevent unnecessary accidents and consequenting injuries and deaths due to operators negligent actions in trying to remove the psychological fear associated with the inability to see around forward obstructions.

BRIEF DESCRIPTION OF THE DRAWINGS

The above and other objects, features, and advantages of the invention will become more readily apparent from the following with reference to the accompanying drawings in which.

DETAILED DESCRIPTIONS OF THE DRAWINGS

Figure 1:
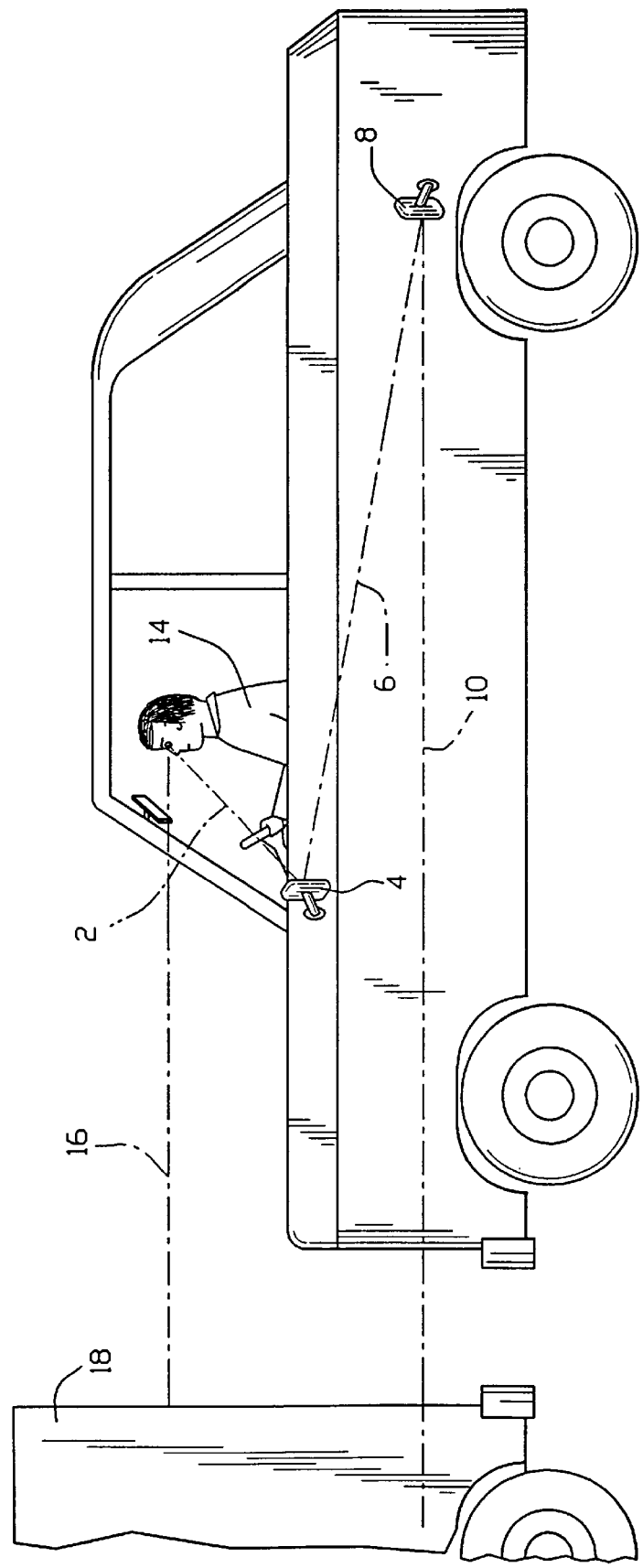
FIG. 1 is a side elevation of the automobile incorporating the driver side embodiment of the invention.
Figure 3:
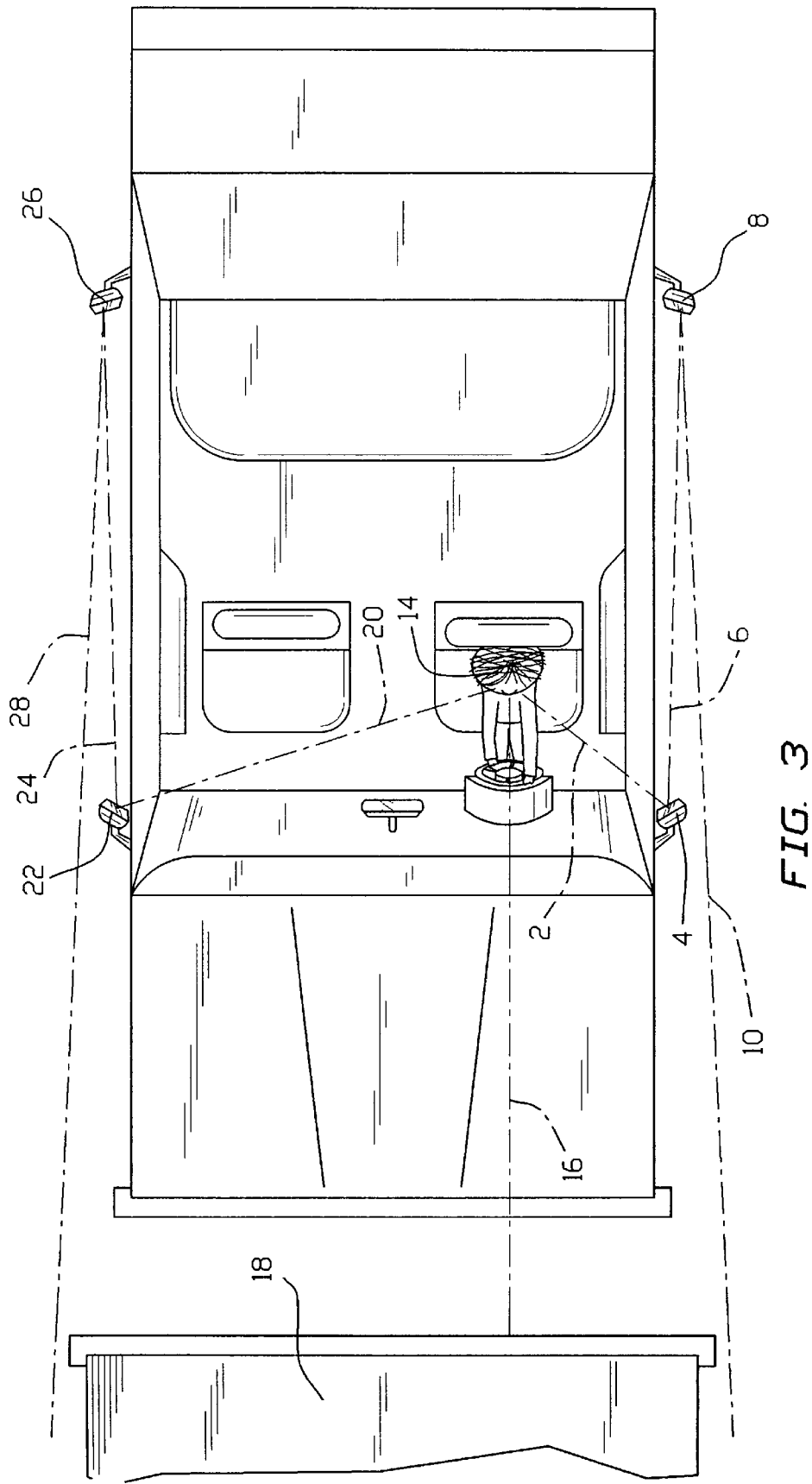
FIG. 3 is a top view of the automobile illustrating both the passenger side and driver side embodiments of the invention.

The driver's side embodiment of this invention, illustrated in FIGS. 1 & 3, allows the automobile operator 14 to view around a forward obstruction 18 by peering into an existing or auxiliary driver's side rear view mirror 4. The image that is reflected to the driver 14 is the area of the road which is left and forward of the automobile. This allows the driver 14 to see around an obstruction when the direct forward vision path 16 is blocked 18 without moving the vehicle into an adjacent lane.

The augmentation of vision is accomplished by a pair of properly angled mirrors 4, 8. When the driver 14 wishes to utilize the system, he will gaze 2 into the auxiliary side rear view mirror 4. This mirror 4 is angled to reflect the vision 6 to the forward viewing side mirror 8 which will give the driver a clear vision path 10 to see around the forward obstruction 18.

Both of the mirrors 4, 8 are fully adjustable to allow the clear vision path 10 for physically differing drivers 14. The location of the auxiliary side view mirror 4 depends on the make and model of the car but will generally be located above, below, or beside the existing side rear view mirror 20, if the existing side view mirror itself is not modified, with split vision or mechanically adjustable, so as to be used as the auxiliary mirror 4.

The position of the forward viewing side mirror 8 similarly depends on the type of automobile but will generally be located at the front of the rear quarterpanel. The forward viewing side mirror 8 is located at a different horizontal level than the auxiliary rear view mirror 4 to prevent the latter from obstructing the clear vision path 10. Other than this limitation in positioning, the horizontal level of the forward viewing mirror 8 is not critical to the system and therefore is placed at point in which the combination of aesthetics and utility is optimum for each individual make of automobile.

Figure 2:
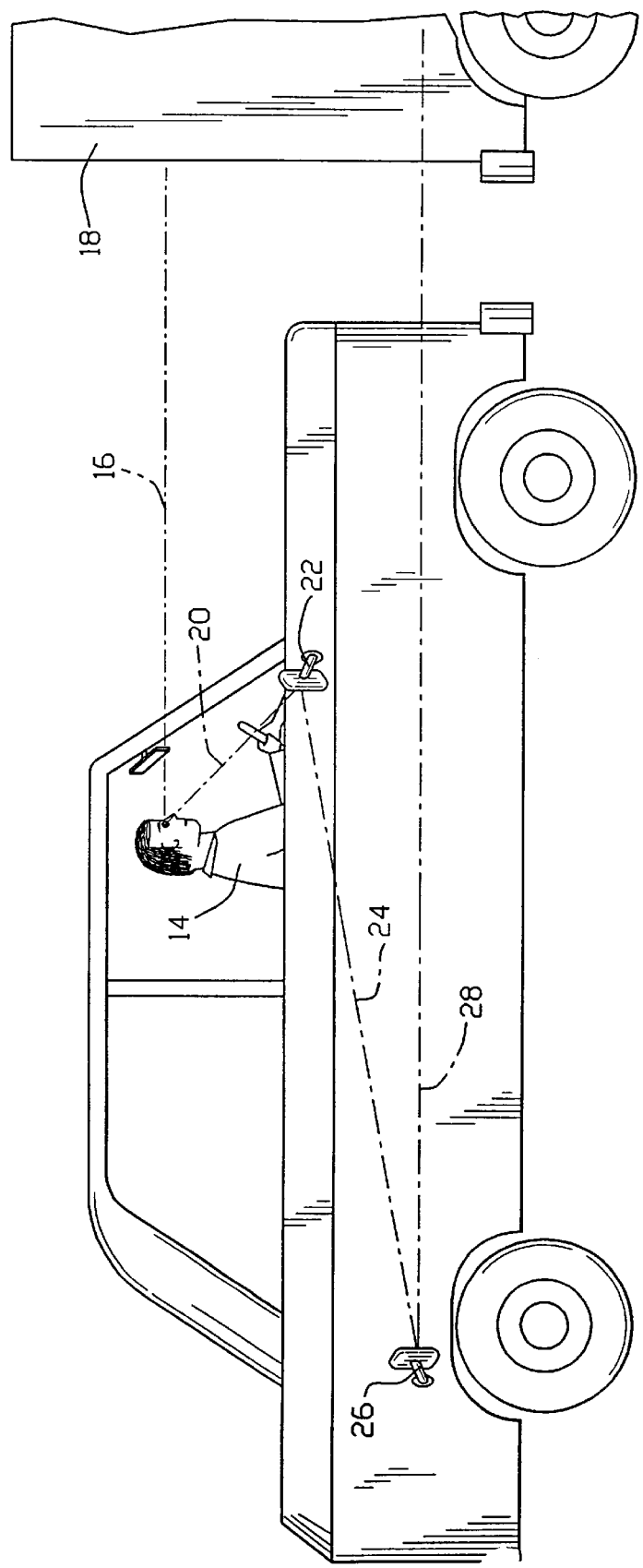
FIG. 2 is a side elevation of the automobile incorporating the passenger side embodiment of the invention.

In the passenger side embodiment, illustrated in FIGS. 2 and 3, the system of mirrors operates in the same manner as the driver's side embodiment, except the image reflected to the driver 14 is that which lies in front and to the right of the car.

In this embodiment, the driver 14 will gaze 20 across the passenger compartment of the car into an auxiliary passenger side view mirror 22. The auxiliary passenger side view mirror 22 is located directly above, below, or beside the existing passenger side view mirror, if the existing side view mirror is not modified to incorporate the auxiliary passenger side view mirror 22. This mirror is angled such that the resulting reflection of vision 24 from this mirror is aimed at the passenger side forward viewing mirror 26. This mirror is angled so that it produces a clear vision path 28 on the right side of the car, enabling the driver 14 to see this area upon looking into the first mirror 22.

As with the driver side forward viewing mirror 8, the passenger side forward viewing mirror 26 is located at a forward area of the rear quarterpanel at a horizontal level different from that of the passenger side rear view mirror 22. Again, the horizontal level of the forward viewing mirror 8 is not essential to effective operation of the system and is to be located where the combination of aesthetics and utility is optimum for each individual model of automobile.

Figure 4:
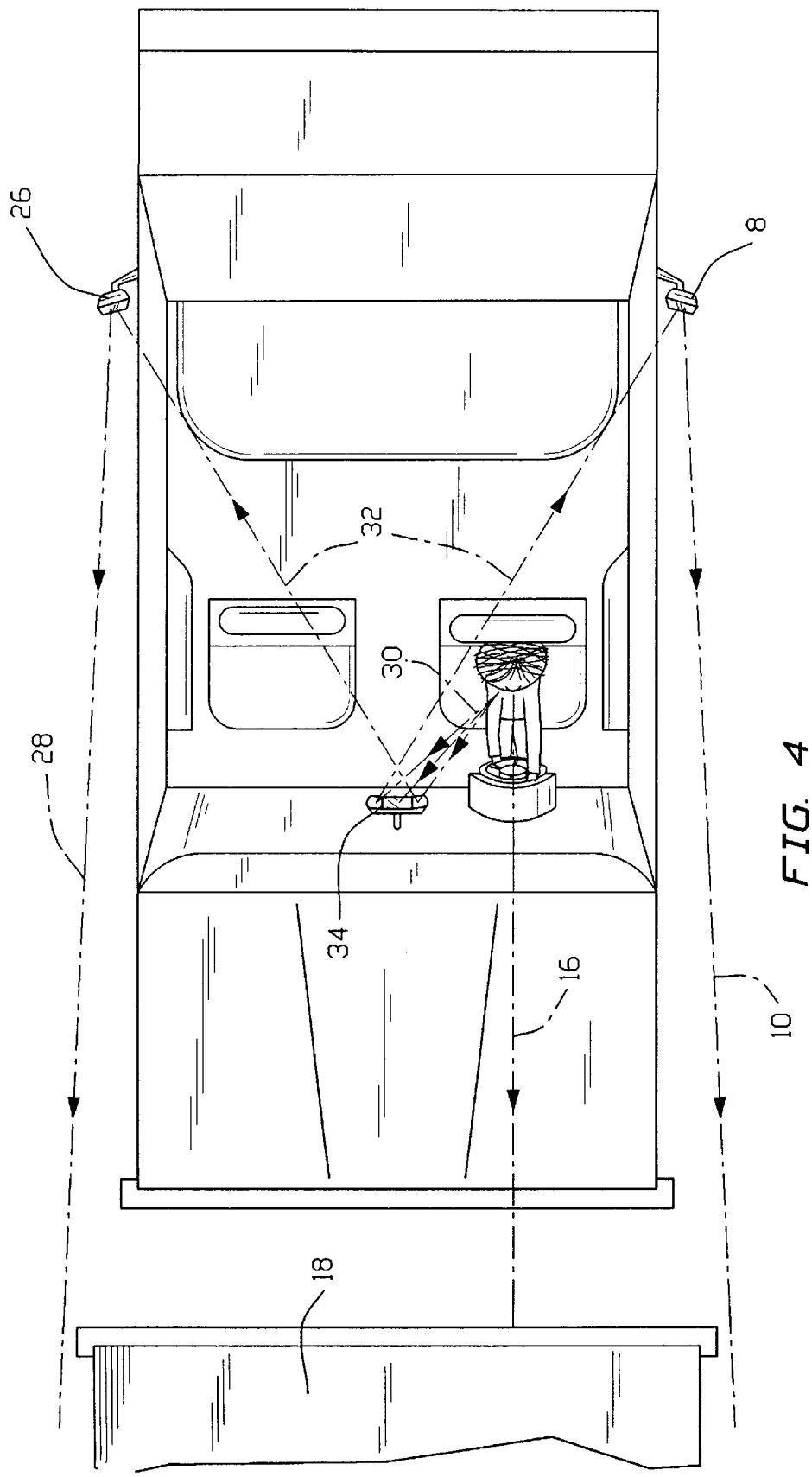
FIG. 4 is a top view of the automobile illustrating the interior embodiment of the invention.
Figure 5:
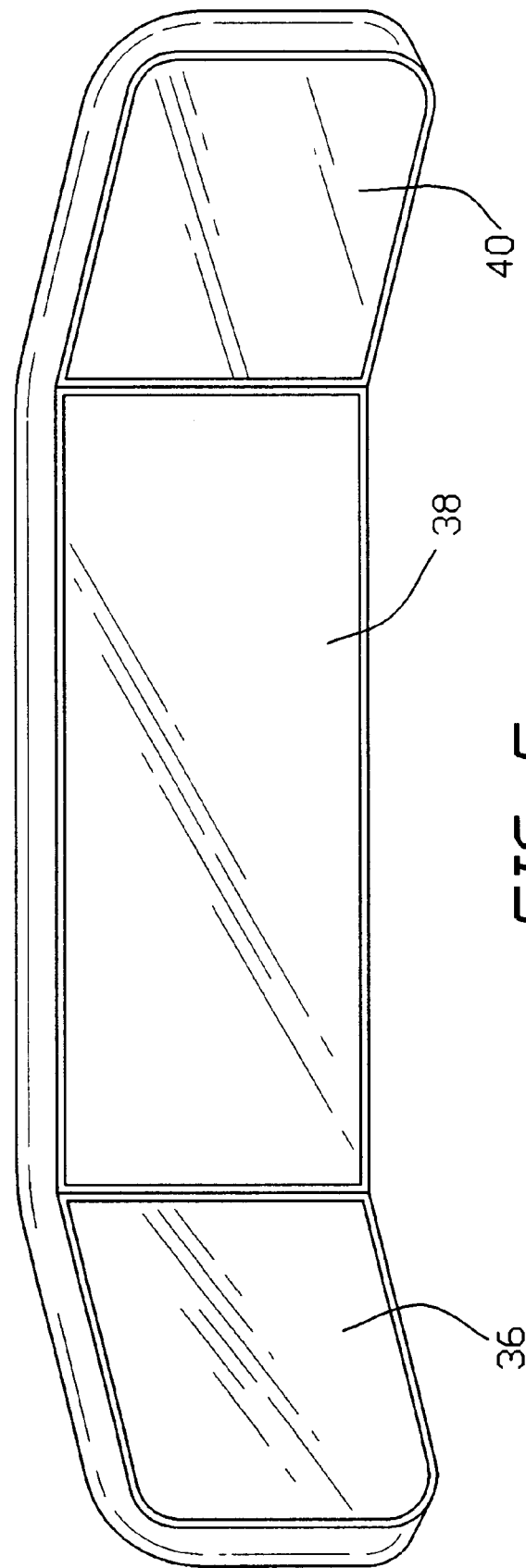
FIG. 5 is an enlaged view of the mirror of FIG. 4.

The interior embodiment of mirrors is shown in FIGS. 4 and 5. This embodiment allows the driver 14 to see the clear vision paths to the right 28 and left 10 of the obstruction by gazing into an auxiliary or modified interior rear view mirror mounted 34 to the windshield. The driver's 14 sight, upon viewing 30 into the interior rear view mirror 34, will be reflected 32 to either the driver side forward viewing mirror 8 or the passenger side forward viewing mirror 26. These mirrors will be angled in a manner that allows a clear vision path, on the right side 28 and the left side 10, to the areas in front of the car which are obstructed from direct viewing.

The interior mirror 34 can be modified to allow viewing of three different areas: the area directly behind the automobile, the passenger side forward viewing mirror, and the driver side forward viewing mirror, and is illustrated in FIG. 5. When the driver 14 gazes into the left side 36 of the mirror 34, vision is reflected to the driver side forward viewing mirror 8. When the driver 14 gazes into the right side 40 of the mirror 34, vision is reflected to the passenger side forward viewing mirror 26. Gazing into the center 38 of the mirror 34 reflects vision as would a typical interior rear view mirror, behind the vehicle.

In the interior embodiment, there is a restriction on the placement of both of the forward viewing mirrors 8, 26. These mirrors 8, 26 must be located at a high enough level on the automobile to allow the reflection from the auxiliary interior rear view mirror 34 to not be blocked by the car body or the interior seats. Notwithstanding this limitation, the mirrors 8, 26 are placed where the combination of aesthetics and utility are optimum for each individual model of automobile.

The auxiliary mirrors in this system for viewing to the rear of the car 4, 22 can be eliminated if the existing rear view mirrors 5 are modified with a mechanical adjusting means operated by a convenient electrical switch 7. There are many means of electrically and non-electrically adjusting the mirrors on an automobile that are well known to those skilled in the art of manufacturing automobile mirrors, the subject matter of the present invention. The mirrors would thus adjust themselves to a preset angle, aimed at their respective forward viewing mirrors, upon operation of a switch. The mirrors would then return to their original angle, aimed to allow vision behind the driver, upon further operation of the switch. This will allow the driver to utilize the system of mirrors to see forward only when he or she feels that it is necessary, without having an additional or split view rear view mirror added to the car.

This same system of vision augmentation can be employed in vehicles other than automobiles, such as trucks and buses as well as for industrial uses such as on construction equipment or warehouse moving equipment.

The preceding description represents this invention in its preferred embodiments. It is understood that this invention can deviate from this description without departing from the scope of the claims.

What is claimed is:

1. A system of mirrors for vision augmentation on a vehicle comprising:

a first reflecting means being located in front of a driver of a vehicle, said first reflecting means being attached to the exterior and on the side of said vehicle;

a second reflecting means being located behind said driver and on the exterior of at least one side of said vehicle;

said second reflecting means being angled to reflect images to said first reflecting means, wherein said images are the areas which are in front of and to the left or right of said vehicle which are obstructed by an object positioned directly in front of said driver; and said first reflecting means being angled to reflect said images to said driver.

2. A system of mirrors for vision augmentation on a vehicle as recited in claim 1, wherein, said first reflecting means is an existing side rear view mirror, having an adjusting means whereby said side rear view mirror is angled to a predetermined view.

3. A system of mirrors for vision augmentation on a vehicle comprising:

a first reflecting means being located in front of a driver of a vehicle, said first reflecting means being located on interior of the vehicle at the center of an upper part of a windshield of said vehicle;

a second reflecting means being located behind said driver and on the exterior of at least one side of said vehicle;

said second reflecting means being angled to reflect images to said first reflecting means, wherein said images are the areas which are in front of and to the left or right of said vehicle which are obstructed by an object positioned directly in front of said driver; and said first reflecting means being angled to reflect said images to said driver.

4. A system of mirrors for vision augmentation on a vehicle as recited in claim 3, wherein, said first reflecting means is a modified existing rear view mirror, said modification being at least two independent reflecting angles.

* * * * *